United States Patent [19]

Stone

[11] 4,373,961
[45] * Feb. 15, 1983

[54] PROCESS AND COMPOSITION FOR USE IN RECYCLING OF OLD ASPHALT PAVEMENTS

[75] Inventor: Eugene M. Stone, Denver, Colo.

[73] Assignee: Penelizer Corporation, Commerce City, Colo.

[*] Notice: The portion of the term of this patent subsequent to May 19, 1998, has been disclaimed.

[21] Appl. No.: 310,837

[22] Filed: Oct. 13, 1981

[51] Int. Cl.³ .............................................. C08L 95/00
[52] U.S. Cl. .............................. 106/281 R; 106/277; 404/72
[58] Field of Search ................... 106/277, 281; 404/72

[56] References Cited

U.S. PATENT DOCUMENTS 4,000,000 12/1978 Mendenhall ........................ 106/280
4,256,506 3/1981 Mendenhall ........................ 106/280
4,268,318 5/1981 Stone ................................... 106/277

OTHER PUBLICATIONS

Chem. Abst. 86:46755d, Saylak et al, 1976.

Primary Examiner—Theodore Morris
Attorney, Agent, or Firm—Cushman, Darby & Cushman

[57] ABSTRACT

This is a process and composition related to recycling old asphalt pavements into new pavements. It is accomplished by adding a special asphalt emulsion to the crushed old asphaltic pavement material without requiring the addition of new aggregate or heating. The old material is cemented at the ambient temperature into a new durable composition of high stability and water resistant without rejuvenation, softening or other appreciable change in the old asphalt, such steps being eliminated by selection of the degree of hardness and character of the asphalt base stock in the special emulsion.

24 Claims, No Drawings

PROCESS AND COMPOSITION FOR USE IN RECYCLING OF OLD ASPHALT PAVEMENTS

BACKGROUND OF THE INVENTION

The present invention relates to a new and novel process for the recycling of old asphaltic pavements into new durable asphalt pavements without the need to add new aggregate material and rejuvenating or softening agents. Furthermore, the process of the present invention is carried out at the ambient temperature without the need to heat the old asphalt pavement.

All of the methods currently employed to recycle old asphaltic pavements consist of the following essential steps. First, the old pavement must be crushed and carefully screened. This process is usually conducted at a site removed for surface being repaved. Second, a quantity of new aggregate must be heated to about 700° F. and then added to and mixed with the old asphaltic pavement with the resultant mixture having a temperature of about 270° F. Third, a rejuvenation agent or solvent is added to soften the old asphalt and return it to its original softness and life, i.e., penetration and ductility. Alternatively, new paving grade asphalt cement is added to the mixture. Fourth, the old asphalt, new aggregate, rejuvenation agent, or cement, must be mixed at a temperature of approximately 270° F. Finaly, the hot mixture is brought to the road surface site and is laid on the road base, leveled and rolled, while still hot into a new pavement.

These conventional processes however suffer from many disadvantages. There is an immense consumption of energy for heating the new aggregate and the old asphaltic pavement. A rejuvenation material must be employed. Expensive and specially built mixing equipment is required to facilitate the addition of the heated new aggregate to the recycled material in order to avoid burning the old asphalt. These processes can only use about two-thirds of the old asphaltic pavement which means that the other one-third must be disposed. Also, new aggregate must be purchased to replace the one-third which cannot be used. These processes are usually conducted at asphalt plants far removed from the road surface site which requires transportation to and from the site. The new pavement must be laid and compacted while still hot. Finally, the resulting strength of the new road surface, i.e. the compressive strength is normally much less than a completely new hot-mix pavement.

Additionally, there are problems in meeting air pollution standards.

The process of the present invention overcomes all of these problems as it can use 100% of the old asphaltic pavement material without the need for rejuvenation and heating. This process can be done at the road surface site. In addition, and totally unexpected, is the fact that the new pavements made in accordance with the present invention have an extremely high compressive strength.

SUMMARY OF THE INVENTION

With the foregoing and other considerations in view, the present invention was conceived and developed and comprises, in essence, an asphalt base stock composition having low penetration, yet high ductility. The entire penetration range of about 10 to about 50, (the optimum being about 25 to about 50) measured at 77° F., will have a ductility in excess of three (3) times the penetration, in centimeters measured at 77° F., pulled at the rate of 5 cm/minute. The ductility of the base stock composition asphalt in the 25 to 50 penetration range will exceed 100 cm and sometimes 150 cm, the latter being the limit of standard ductility testing equipment. This composite material is especially suited for use as an asphalt emulsion which can be mixed with old crushed asphaltic pavement in recycling operations.

The base stock comprises a first component, hereinafter called "asphalt pitch" or "pitch". This pitch has a penetration of less than about 25 (77° F.) and a softening point which is approximately 185° F. minus three times the penetration, in accordance with the criteria established in U.S. Pat. No. 3,216,336, the description of which is hereby incorporated by reference. The preferred pitch has a penetration of less than about 10. The ductility of this pitch is low, less than about 10, but this same material, blended with a conventional paving grade asphalt cement to form a composite asphalt, yields ductilities in that material significantly exceeding the ductiilties of either of the original materials. This is disclosed in U.S. Pat. No. 4,268,318.

The base stock includes a second component, an asphalt cement having a penetration between 60–300 (77° F.). The asphalt cement requirement is set forth in ASTM D 3381-76 and D 946-74, the standard specifications for VISCOSITY-GRADED and PENETRATION-GRADED ASPHALT CEMENTS FOR USE IN PAVEMENT CONSTRUCTION. The asphalt pitch and asphalt cement are blended in varying proportions to produce the "base stock", or composite asphalt, which will have a penetration of about 50 or less. A further desirable property of the base stock is a low softening point, a property indicating resilience, adhesion and cohesion in the base stock. The proportions of asphalt pitch and asphalt cement are determined by the physical properties of the old asphaltic pavement being recycled. The amount by weight of the pitch will usually range from about 5% to about 40% of the base stock.

The base stock is especially suited to produce an emulsion and the resultant emulsion is particularly suited for the purposes of this invention. Such an emulsion will have water as the continuous phase and may be anionic or cationic, although the latter is usually preferred to impart anti-strip properties when blended with aggregate. When this emulsion is mixed with old asphalt pavement, a unique, synergistic pavement is formed. The final product has a surprisingly high bearing strength and is resistant to adverse effects of water.

DETAILED DESCRIPTION OF THE INVENTION

The asphalt binder used in the present invention is an asphalt pitch which may be solvent extracted, vacuum reduced, or an equivalent thereof, as previously described in U.S Pat. No. 3,216,336. The low penetration asphalt is blended with a paving asphalt cement normally having a penetration of 60–300, although asphalts of lower penetration may be used. Suitable asphalt pitches include: Cenex, from Laurel, Montana; Lion Oil Company, Eldorado, Arkansas; Union Oil Co. of California, Nederland, Texas. Pitches of simlar character are available throughout the country and many refineries can produce a pitch suitable for this purpose. Conventional, standard grades of asphalt cements are generally available from most asphalt refineries and are supplied according to required specifications.

Penetration figures given herein are those determined by ASTM-D-5; ductility is determined by ASTM-D-113; and softening point by ASTM-D-36. The softening point is included in the present description to distinguish the present compositions from asphalts having high softening points, such as air blown asphalts, which asphalts are generally hard and brittle and unsatisfactory for highway purposes.

Table I below shows properties of an improved base stock composition compared to other known hard base and a standard asphaltic materials:

TABLE I

| Sample | 1 Improved Base Stock | 2 United II | 3 United III | 4 Trumbull IV | 5 AC-10 |
|---|---|---|---|---|---|
| Penetration at 77° F. | 39 | 19 | 26 | 19 | 70–105 |
| Softening Point, °F. | 128.5 | 164.5 | 188.5 | 205 | 92 |
| Ductility at 77° F. 5 cm/min | 150+ | 4.75 | 2.5 | 2.0 | 100+ |

The improved base stock, item 1, was prepared as hereinafter described and consists of a pitch obtained from Cenex Refinery of Laurel, Montana blended with an asphalt cement obtained from the same refinery. Items 2–4 represent known hard asphalts used for roofing products. Their very low ductilities make them undesirable for use in paving applications as the resulting pavements are brittle and subject to rapid and severe cracking. Sample 5, AC-10, is a standard paving grade asphalt manufactured by Cenex Refinery according to ASTM-D-3381.

The foregoing Table I demonstrates that the properties of the base stock are unlike those of any prior art asphalt composition used for paving purposes and as such makes possible the special uses of the material as will be hereinafter set forth.

U.S. Pat. No. 4,268,318 is based on a product composed of a blend of "pitch", i.e., a zero to very low penetration asphalt refined under special conditions, which, when combined with paving grade asphalt cements of much higher (softer) normal asphalts, produces a composite base stock asphalt of superior ductility, which may be easily emulsified. Further research has discovered that a hardness (penetration) of the composite asphalt between about 10 and about 50 (at 77° F.), results in an emulsion which yields asphalt-aggregate mixtures of superior strength and stability. Thus, this base stock is especially valuable for use in recycling and reclaiming old asphalt pavements. In this use, the present invention permits the use of the crushed or pulverized old pavement material en toto without the necessity of adding new aggregate, the latter usually being a requisite for other types of reconstituting the old pavement material.

Research and tests performed after the filing of the U.S. Pat. No. 4,268,318 patent have revealed that the composition base stock disclosed in that patent, has other, more valuable characteristics.

The asphalt compositions described in the referenced patent are made by combining a very low penetration specially produced asphalt pitch (solvent extracted or equivalent), its penetration being normally in the range of from about 0 to about 10 (hard, the zero pen being brittle at room temperature), with a conventional paving grade asphalt cement having a normal penetration range at 77° F. of 60 to 300 (soft). In this combining procedure, the ductility, or "liveliness" (distinguishing asphalt from such materials as waxes) of the paving grade asphalt is enhanced by the addition of even relatively small proportions of the pitch asphalt.

In addition to the creation of a superior product by the combining of two materials, other effects can also be obtained. Since the pitch is of very low penetration, (or even zero) and the asphalt cement is in the order of 60 to 300 penetration, it follows that by varying the proportion of the two constituents, the penetration of the combined asphalt may be varied from a very low penetration to one approaching the maximum 300 penetration of the paving grade material. A finite selection of the hardness of the combined asphalt is therefore practical. In the present invention, use is made of this ability to predetermine the required hardness of the combined, composite "base stock" asphalt.

Whereas, the conventional methods of reclaiming, reconstituting and recycling of old asphalt pavements has consisted of adding resins or solvents which reverse the hardening of the old asphalt and make it into a softer material (restoration of the original softness), the ability to control and select a finite degree of hardness in the combined material of the referenced patent, has led to the discovery of a new structure in the mixture of crushed, pulverized old pavement material and the added new composition. In the present invention, softening of the old asphalt is specifically avoided, while high strengths, stability and durability of the new mixture, when placed and compacted in vehicular ways, are surprisingly obtained. The structure may be simply explained as being one in which the asphalt base stock of the present invention provides, in essence, the whole and complete binding and cementing material. The old pavement particles, the old asphalt particles, together with the old aggregate particles are thus cemented together using the new composite base stock asphalt. The old asphalt material acts only as simulated aggregate particles and has no cementing action relative to the new particles created by crushing and pulverization of the old pavement.

Unexpected high strengths and stabilities are obtained, not only through the interlocking of the old pavement particles themselves but more so by the strength of the bond established between these particles by the low penetration of the new, composite asphalt, i.e. the base stock.

Softening of the old asphalt in the reclaimed material is prevented by the selection of a predetermined hardness of the base stock in the composition. Asphalts in the range of 60 to 300 penetration contain an appreciable amount of oily constituents, similar to bright stock or lubricating oil. These oils are present in varying degrees of compatibility with the basic asphalt micelle (without the oily constituent, the basic micelle would be hard and brittle) and in any degree of incompatibility between the oil and the micelle, this oil is subject to exudation (as may be measured by ASTM Standard Method D1328-76) or the release of oils to the air or any materials with which it may be in contact, including other asphalts. The asphalts to be described hereinafter, being of low penetration, i.e., about 10 to about 50, contain much smaller proportions of oily constituents, not subject to exudation. This resistance to exudation is greatly increased by the effect of the pitch asphalt on the paving grade asphalt cement in the base stock. The reaction of the pitch on the ductility of the paving grade asphalt cement, as described in the referenced patent, also acts to retard the exudation of oil from the composite asphalt base stock herein described. The retardation of exudation of oil due to the minimum proportion of oil in the composite asphalt, permits effective control of any softening reaction which may tend to take in the old asphalt of the reclaimed pavement material. It is therefore established that in the recycling process of the present invention, the cementing action of the composite base stock asphalt, when added in emulsion form to crushed, pulverized old pavement material, constitutes, essentially in entirety, the new basic cementing material and that the old asphalt is not softened or rejuvenated by contact with the added composite asphalt.

The degree of hardness existing in the asphalt of the old pavement will vary depending on the type of asphalt originally used and the degree of aging to which it has been subjected, as well as the proportion (percent) of asphalt to aggregate in the original pavement. The degree of hardness (to which is allied adhesiveness, cementing, bonding, and resistance to exudation) of the base stock to be selected for the composition is affected by these factors. Old pavement material in which either the existing asphalt is excessively soft or in an excessive proportion, may dictate use of a relatively low (hard) penetration composition asphalt base stock. "Dry" or lean old material, or old material having an asphalt in advanced stages of aging, may require use of a higher penetration (softer) composite asphalt base stock.

The reference patent, U.S. Pat. No. 4,268,318, discloses the use of asphalts having penetrations of from 25 to 50, as measured by ASTM Standard Test Method D 5-73, at 77° F. However, it is evident that for the purposes of this invention, the asphalts of the compositions may desirably and sometimes necessarily, be less than 25 penetration. To achieve the purposes of the present invention, it is evident that for some conditions, penetrations as low as about 10 or even less, may be requred. Not only the penetration, but also the ductility of the combined asphalt in the compositions is essential. Penetrations of less than about 25 may yield ductilities less than the 100 cm recited in the referenced patent. However, at very low penetration, the effect of the pitch on the paving grade asphalt cement still produces significant ductilities, in excess, in cm at 77° F., 5 cm/min, of three times the penetration at 77° F. Such ductilities, relating to penetrations, yield materials capable of performing in accordance with this invention, as herein described.

Thus, the process of the present invention comprises a process for recycling old asphaltic pavement. The old pavement is crushed and then added to an emulsion comprising the base stock of the present invention. The composition of the base stock will vary in accordance with the physical properties of the reclaimed asphaltic pavement but will be in the general range set forth in the present specification. The physical properties of the base stock are, in turn, determined by the asphalt pitch and asphalt cement from which the asphalt base stock is made.

The emulsion usually contains a minimum of 35% by weight of water to the weight of the emulsion, but can vary substantially in order to achieve the desired results. Preferably, the water content will be about 40% by weight. Known emulsifying agents may be added, if desired.

The present invention surprisingly allows the use of 100% old asphaltic pavement instead of the approximately 66% used in conventional processes. Of course, if desired, new aggregate can be added to the old asphalt in practicing the present invention.

Normally, the amount of emulsion by weight to the weight of the old asphalt pavement will range from about 2.5% to about 10% but if some aggregate is employed additional amounts of emulsion will be required, e.g., up to 15% or greater. Similarly, the amount of asphalt base stock to old pavement will range from about 1.5% to about 6% by weight but can be increased if some aggregate is used to, for example, up to 10% by weight.

After the asphalt emulsion is formed, the aggregate which is comprised of the recycled crushed old pavement is added. The resultant pavement material is then laid and compacted as a pavement course, such as a pavement surface, base or subbase. The water is then allowed to leave the pavement course thereby binding the base stock and the aggregate.

Demonstrations of the various reactions as occurring in the mixtures of old crushed or pulverized asphalt pavement materials with the composite asphalt of this invention are difficult to obtain by conventionl methods of solvent extraction, recovery and testing of the soluble portions of the recycled mix. The effects of the composition on the reclaimed material must therefore be determined principally by physical tests made on laboratory prepared and tested mixtures, and on the actual behavior of the recycled mixture under traffic with time. For laboratory testing, compaction and subsequent compression testing, after curing, using the procedures described in patent 4,268,318 have been found satisfactory and correlate to performance in service. Data from such tests are hereinafter recited.

EXAMPLES AND TESTS

EXAMPLE 1

A base stock was provided using an asphalt pitch from Cenex Refinery of Laurel, Montana having the following properties:

Penetration: 0 at 77° F.
Softening Point: 198° F.
Ductility: 5 (cm)

An asphalt cement was provided which is designated by ASTM-D-3381, commonly called AC-10. The asphalt cement was produced from the Cenex Refinery and has the following properties:

Penetration: 70–105 at 77° F.
Softening Point: 92° F.
Ductility: 100+ (cm)

20% pitch was blended with 80% asphalt cement to produce a base stock having the following properties:

Penetration: 39
Softening Point: 128° F.
Ductility: 150+ (cm)

This base stock having a penetration in the desirable range of 25-45 and a high ductility has the desirable properties such as would be produced by a Trinidad asphalt, and tests were made to determine its properties as hereinafter set forth.

EXAMPLE II

An asphalt pitch was provided from Lion Oil Co. refinery of Eldorado, Arkansas having the following properties:

Penetration: 7
Softening Point: 195° F.
Ductility: 5 cm

The asphalt cement, an AC-10, from the Cenex Refinery, used in Example I, was blended with the pitch in the proportions of 40% pitch and 60% asphalt cement to produce a base stock having the following properties:
Penetration: 33
Softening Point: 130° F. Ductility: 150+ cm Again this base stock has the desirable properties heretofore noted.

EXAMPLE III

An asphalt pitch was provided from Union Oil Company of California Refinery of Nederland, Texas having the following properties:
Penetration: 6
Softening Point: 189° F.
Ductility: 4 cm The asphalt cement, an AC-10 from the Cenex Refinery, used in Example I, was blended with the pitch in the proportions of 40% and 60% asphalt cement to produce a base stock having the following properties:
Penetration: 40
Softening Point: 125° F.
Ductility: 150+ cm Again this base stock has the desirable properties heretofore noted.

EXAMPLE IV

The base stock of Example 1 was emulsified with the water being the continuous phase. The emulsion was a cationic emulsion containing 39% water.

EXAMPLE V

The base stock of Example II was emulsified with the water being the continuous phase. The emulsion was a cationic emulsion containing 39% water.

EXAMPLE VI

The base stock of Example II was emulsified with the water being the continuous phase. The emulsion was a cationic emulsion containing 39% water.

The amount of material being reclaimed and removed from existing asphalt roads, streets and airfield pavements is truly voluminous, especially since machinery has been developed to scarify and plane off existing pavements. Attempts to use this material en toto, as reclaimed with the addition of either conventional asphalts, or solvent type additives have been generally unsuccessful, primarily because the addition of a solvent or a conventional asphalt will, as a new binder, overfill the voids and soften the old asphalt, thus causing instability of this material when relaid as a surfacing or base course under traffic. New aggregate therefore must be added, at considerable expense, to stabilize such a pavement. A small quantity of reclaimed roadbed material stored by the Colorado Highway Department in Mesa County near Grand Junction, Colorado, was mixed with the emulsion of Example IV, and test specimens were prepared. The additional asphalt emulsion was 5%, i.e. 3% composite asphalt by weight of the roadbed material. The result was a stable mix with surprising high compressive strength and good stability. There was no need for adding new aggregate, indicating again a result which cannot be obtained with conventional emulsions or hot mixes.

The following comparative testing shows quite clearly the unexpected superior compressive strength of a new pavement material produced in accordance with the present invention.

COMPARATIVE COMPRESSIVE STRENGTHS

1. Hot-mix—new pavement
    Graded aggregate—6.3% of AC-10: 407.1 P.S.I.
    Lord Laboratories Test 2/13/81
2. Hot-mix—new pavement
    Graded aggregate—6% AC-10: 230.76 P.S.I.
    Penelizer Laboratory—7/1/81
    After four days in water: 236.04 P.S.I.
3. Old pavement after years of use, treated at ambient temperature with 4% CSS-1H asphalt emulsion: 381.98 P.S.I.
    Same material after being submerged in water for four days: 428.08 P.S.I.
4. Old pavement after years of use, treated at ambient temperature with the asphalt emulsion of the present invention (CSS-P): 570.32 P.S.I.
    Same material after being submerged in water for four days: 750.70 P.S.I.

To summarize, the conventional processes for recycling old asphaltic pavement consists of the following steps:
1. Crush old pavement and screen to required gradation (usually ¾" minus, but sometimes 1½" minus.)
2. Heat about one-third new aggregate to as high as 700° F. and blend new hot aggregate with the crushed old aggregate, thereby heating the mixture of old pavement and new aggregate to the mixing temperature which is usually approximately 270° F.
3. Add a "rejuvenation agent" to soften the old asphalt in the pavement and supposedly return it to its original softness and life (penetration and ductility), or:
4. Add new, soft, paving grade asphalt cement (usually about 3%.)
5. Mix old pavement, new aggregate, rejuvenation agent, or new asphalt cement at a mixing temperature of approximately 270° F.
6. Haul mixture to site of application, lay on road base, level and roll, while still hot, into a new pavement.

References as to such current solvent and hot-mix methods and pocesses are:
1. "Public Roads", June, 1981, Vol. 45, No. 1, a Journal of highway Research and Development, U.S. Department of Transportation, Federal Highway Administration, pages 12 to 18, inclusive, entitled, "CURRENT RESEARCH IN THE UNITED STATES TO EVALUATE MATERIALS USED IN RECYCLING ASPHALT PAVEMENTS."
2. Recycling of Bituminous Pavements, STP 662, American Society for Testing and Materials, Library of Congress Number 78-68321.
3. Rural & Urban Road, July, 1981.
4. Barber-Greene's Recyclomat System.

The disadvantages of the conventional processes include the following:
1. Consumption of large amounts of energy for heating of new aggregate and new asphalt cement.
2. Purchase cost of rejuvenation agent.
3. Purchase of new aggregate (about one-third).

4. Necessity of using special mixing equipment to permit addition of hot new aggregate to the reclaim material (to avoid burning old asphalt).
5. Disposal problem of the unused old aggregate (about one-third) on each job.
6. Requirement to place, compact and complete new pavement while mixture is still hot.
7. Resulting strength of pavement (compressive strength) is normally much less than a completely new hot-mix pavement.
8. Difficulties in meeting air pollution standards of the Environmental Protection Agency and various health departments.

In comparison, the process of the present invention comprises the following:
1. Same crushing and screening of old pavement as set forth above.
2. No heating required, thereby saving substantial energy costs.
3. No "rejuvenation" agent, thereby eliminating cost thereof.
4. It is only through the use of the hard base stock asphalt, in emulsion form that the novel effects of the cementing action of the base stock asphalt, without heating or rejuvenation of old asphalt, can be obtained.
5. No need for new aggregate, thereby eliminating cost thereof.
6. 100% of old pavement (not two-thirds) can be used, thereby eliminating the cost of new aggregate and disposal problem of excess old pavement.
7. All mixing of old pavement and a small percentage of this emulsion (usually 5% emulsion—equivalent to 3% base stock asphalt) can be done without heating and in most cases, at site of use; thereby eliminating cost of hauling materials to and from central mixing plant.

The present process is the direct antithesis of the asphalt pavement recycling processes generally in use. These processes involve heat, absorption or solvent processes; whereby the old asphalt binder is softened by heating or by use of chemical rejuvenating agents or soft asphalt, new asphalt cement and new aggregate are usually added and mixed, also by hot-mix processes, which consumes large amounts of heat energy.

The present process makes possible the use of 100% old asphalt pavement (instead of two-thirds or less) and mixing at ambient temperature, thereby saving heat energy and saves the costs of both chemical rejuvenators and new aggregate. To accomplish this, specially compounded, low penetration, composite base stock asphalts, in water emulsion form, are used which, while possessing the ability to permanently cement and bond together the old particles of asphalt, aggregate and filler as existing in the reclaim material, do not soften in any appreciable degree, the old asphalt cement which has normally greatly hardened in use.

One objective is not to soften the old asphalt cement but to specifically maintain its hardness with a recementation of all the old particles of both the old asphalt cement and the old pavement into a reconstituted pavement, by specifically avoiding any appreciable change in the character of the old asphalt binder material and in which the old asphalt cement acts essentially only as aggregate.

A second objective is to obtain this recementation by substituting an entirely new cementing material. This new material, the composite base stock asphalt, has, within itself, and by itself, all of the properties and character necessary to cement all particles together into a new mixture, having all the necessary properties of pavement. The composite asphalt, of low penetration asphalt cement, i.e., about 10 to about 50 penetration, has a low softening point, i.e., from about 130° F. to about 160° F., with a ductility greater, expressed in cm, than three times the penetration.

The asphalt compositions and emulsions described in U.S. Pat. No. 4,268,318 have a penetration range of about 25 to about 50, that provide a "live", long life asphalt cement, having superior adhesion, cementing and bonding properties. However, that patent does not recognize what is now recognized in this discovery, i.e., that these compositions may be made and used in selected degrees of hardness, such that while obtaining the necessary cementing action, the oil proportion of such asphalt is sufficiently low, that significant softening of the old asphalt is avoided. High penetration, soft asphalts, or resinous rejuvenating agents, with larger amounts of oily constituents, which are presently used in recycling old pavements, act primarily to soften the old asphalt cement. Therefore, the recementation of old asphalt and aggregate particles by this method and asphalt base stock is a distinctly new and novel approach to the reconstitution and recycling of old asphalt pavement materials into a new strong, durable recycled pavement, with all the advantages hereinabove set forth.

What is claimed is:
1. An asphalt base stock for use in recycling old asphalt pavements into new pavements, said asphalt base stock having the following physical properties.
  (1) a penetration in the range of from about 10 to about 50 measured at 77° F.,
  (2) a softening point below about 160° F.,
  (3) a ductility in excess of three times the penetration, in centimeters at 77° F. when pulled at the rate of 5 centimeter per minute, wherein said asphalt base stock comprises, (1) an asphalt pitch having a penetration of less than about 25 and a softening point in the approximate range of 185° F. minus three times the penetration and (2) an asphalt cement having a penetration between about 60 and about 300.
2. An asphalt base stock in accordance with claim 1, wherein the asphalt pitch has a penetration of less than about 10 and a ductility less than about 10.
3. An asphalt base stock in accordance with claim 1, wherein the amount of asphalt pitch is in the range of from about 5% to about 40% by weight of said asphalt base stock.
4. An asphalt base stock in accordance with claim 1 wherein said asphalt base stock has a softening point in the range of from about 130° F. to about 160° F.
5. An emulsion comprising the asphalt base stock of claim 1 and water, wherein the water is in the continuous phase.
6. The emulsion in accordance with claim 5 wherein the water content is a minimum of about 35% by weight of the weight of the emulsion.
7. A pavement material comprising the emulsion of claim 5 and crushed old asphaltic pavement.
8. Pavement material in accordance with claim 7, wherein the amount of emulsion to said old pavement is in the range of from about 2.5% to about 15% by weight.
9. Pavement material in accordance with claim 7 wherein the amount of asphalt base stock is in the range of from about 1.5% to about 10% by weight of said old pavement.

10. Process for the recycling of old asphalt pavements into new pavements comprising the steps of,
   (1) admixing an asphalt pitch and an asphalt cement to form an asphalt base stock having (a) a penetration in the range of from about 10 to about 50 measured at 77° F., and (b) a softening point of less than about 160° F. and (c) a ductility in centimeters in excess of three times the penetration in centimeters at 77° F. when pulled at the rate of 5 centimeter per minute
   (2) emulsifying said asphalt base stock with water to form an asphalt emulsion
   (3) admixing the asphalt emulsion with an aggregate type of material comprising crushed old asphaltic pavement to form a pavement material
   (4) laying and compacting said pavement material of step 3 as a pavement course.

11. Process in accordance with claim 10 comprising the additional step of,
   (5) allowing the water to leave said pavement course thereby binding said asphalt base stock and said aggregate type of material.

12. Process in accordance with claim 10, wherein the asphalt pitch has a penetration of less than about 25 and a softening point in the approximate range of 185° F. minus three times the penetration.

13. Process in accordance with claim 10, wherein the asphalt pitch has a penetration of less than about 10 and a ductility less than about 10.

14. Process in accordance with claim 10, wherein the amount of asphalt pitch is in the range of from about 5% to about 40% by weight of said asphalt base stock.

15. Process in accordance with claim 10, wherein the asphalt base stock has a softening point in the range of from about 130° F. to about 160° F.

16. Process in accordance with claim 10, wherein the amount of emulsion to said old asphaltic pavement is in the range of from about 2.5% to about 15% by weight.

17. Process in accordance with claim 10, wherein the amount of asphalt base stock is the range of from about 1.5% to about 10% by weight of said old asphaltic pavement.

18. Process for recycling old asphalt pavements into new pavements comprising the steps of,
   (a) crushing said old asphalt pavement to form an aggregate comprising asphalt and mineral matter,
   (b) emulsifying an asphalt base stock with water to form an emulsion wherein said asphalt base stock has the following physical properties,
      (1) a penetration in the range of from about 10 to about 50 measured at 77° F.,
      (2) a softening point below about 160° F., and
      (3) a ductility in excess of three times the penetration, in centimeters when pulled at the rate of 5 centimeters per minute,
   (c) admixing the aggregate of step (a) with the emulsion of step (b) to form a pavement material, and
   (d) laying and compacting said pavement material of step (c) as a pavement course.

19. Process in accordance with claim 18 comprising the additional step of,
   (e) allowing the water to leave said pavement course thereby binding said asphalt base stock and said aggregate.

20. Process in accordance with claim 18 wherein new mineral aggregate material is added prior to step (d).

21. Process for recycling old asphalt pavements comprising the steps of,
   (a) crushing said old asphalt pavement to form an aggregate comprising asphalt and mineral matter,
   (b) emulsifying an asphalt base stock with water to form an emulsion which said asphalt base stock has the following physical properties,
      (1) a penetration in the range of from about 10 to about 50 measured at 77° F.,
      (2) a softening point below about 160° F., and
      (3) a ductility in excess of three times the penetration, in centimeters when pulled at the rate of 5 centimeters per minute, and
   (c) admixing the aggregate of step (a) with the emulsion of step (b) to form a pavement material,
   (d) laying and compacting said pavement material of step (c) as a pavement course
wherein said new asphalt base stock substantially unalters the physical characteristics of the asphalt in said aggregate.

22. Process in accordance with claim 21 wherein new mineral aggregate material is added prior to step (d).

23. Process in accordance with claim 21 comprising the additional step of (e) allowing the water to leave said pavement course thereby binding said asphalt base stock and said aggregate.

24. Process in accordance with claim 21 wherein the penetration of the asphalt in step (b) is selected to a degree of hardness within the range of penetration between about 10 and about 50, measured at 77° F., to obtain the effect of substantially unaltering the physical characteristics of the old asphalt in said aggregate.

* * * * *